(12) United States Patent
Kalpat et al.

(10) Patent No.: US 9,171,112 B2
(45) Date of Patent: Oct. 27, 2015

(54) SEMICONDUCTOR HOLD TIME FIXING

(71) Applicant: Synopsys, Inc., Mountain View, CA (US)

(72) Inventors: Karthik Ramaseshan Kalpat, Campbell, CA (US); Rohit Kumar, Mountain View, CA (US); Narendra Nimmagadda, Bangalore (IN); Saumil Sanjay Shah, Fremont, CA (US); Hsiao-Ping Tseng, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/099,937

(22) Filed: Dec. 7, 2013

(65) Prior Publication Data
US 2014/0165019 A1    Jun. 12, 2014

Related U.S. Application Data

(60) Provisional application No. 61/734,932, filed on Dec. 7, 2012.

(51) Int. Cl.
G06F 17/50    (2006.01)

(52) U.S. Cl.
CPC .................................. G06F 17/5031 (2013.01)

(58) Field of Classification Search
USPC ......... 716/104, 106, 108, 111, 113, 114, 118, 716/119, 126, 134, 135
See application file for complete search history.

(56) References Cited

U.S. PATENT DOCUMENTS

| | | | |
|---|---|---|---|
| 5,784,289 A * | 7/1998 | Wang | 716/122 |
| 6,550,044 B1 * | 4/2003 | Pavisic et al. | 716/114 |
| 7,458,049 B1 | 11/2008 | Tuncer et al. | |
| 7,474,999 B2 | 1/2009 | Scheffer | |
| 7,802,215 B2 | 9/2010 | Reddy et al. | |
| 7,992,114 B1 | 8/2011 | Adams et al. | |
| 8,037,430 B2 | 10/2011 | Papanikolaou et al. | |
| 8,156,463 B1 * | 4/2012 | Fung et al. | 716/113 |
| 8,234,614 B1 | 7/2012 | Wen et al. | |
| 8,261,218 B1 * | 9/2012 | Fung | 716/108 |
| 8,307,317 B2 | 11/2012 | Adams et al. | |
| 2003/0101399 A1 * | 5/2003 | Yoshikawa | 714/744 |
| 2004/0122642 A1 | 6/2004 | Scheffer | |
| 2004/0148583 A1 * | 7/2004 | Hulbert et al. | 716/10 |

(Continued)

OTHER PUBLICATIONS

Chang, Keh-Jeng "Accurate on-chip variation modeling to achieve design for manufacturability", From Proceedings of the 4th IEEE International WorkshoQ on System-on-Chip for Real-Time Applications (IWSOCA?04), (Jul. 2004),219-222.

(Continued)

*Primary Examiner* — Brian Ngo
(74) *Attorney, Agent, or Firm* — Adams Intellex, PLC (57) ABSTRACT

Computer implemented techniques are disclosed for fixing signal hold-time violations in semiconductor chips. Analysis includes estimation of hold-time requirements using ideal clocks. Allocation of placement regions within the design and near the macro circuits allows for later placement and wiring use during layout hold-time fixing. The placement region sizes are based on estimates of the needed buffers. Nets, within the design for detail routing, are ordered such that nets with hold-time violations are wired later, thus fixing hold-time violations without scaling or adding further buffers. Hold times are re-evaluated once wiring of track routes is complete.

28 Claims, 10 Drawing Sheets

(56) References Cited

U.S. PATENT DOCUMENTS

| | | |
|---|---|---|
| 2005/0246117 A1 | 11/2005 | Hathaway et al. |
| 2005/0251771 A1 | 11/2005 | Robles |
| 2006/0059446 A1 | 3/2006 | Chen et al. |
| 2006/0090150 A1 | 4/2006 | Kucukcakar et al. |
| 2006/0107244 A1 | 5/2006 | Yonezawa |
| 2007/0156367 A1 | 7/2007 | Kucukcakar et al. |
| 2007/0174797 A1 | 7/2007 | Luo et al. |
| 2007/0283305 A1 | 12/2007 | Reddy et al. |
| 2008/0005707 A1 | 1/2008 | Papanikolaou et al. |
| 2008/0005907 A1 | 1/2008 | Scheffer |
| 2008/0010558 A1 | 1/2008 | Ikeda |
| 2008/0133202 A1 | 6/2008 | Tseng et al. |
| 2008/0216040 A1* | 9/2008 | Furnish et al. .................. 716/10 |
| 2008/0222586 A1 | 9/2008 | Homma et al. |
| 2008/0270962 A1 | 10/2008 | Chadwick et al. |
| 2009/0228250 A1 | 9/2009 | Phillips |
| 2009/0254874 A1* | 10/2009 | Bose ................................ 716/6 |
| 2009/0265676 A1* | 10/2009 | Yamane ........................... 716/10 |
| 2010/0287517 A1 | 11/2010 | Buss et al. |
| 2011/0087478 A1 | 4/2011 | Tseng et al. |
| 2011/0106497 A1 | 5/2011 | Visweswariah et al. |
| 2011/0302460 A1 | 12/2011 | Idgunji et al. |
| 2012/0254818 A1* | 10/2012 | Liu et al. ....................... 716/124 |

OTHER PUBLICATIONS

Devgan, Anirudh et al., "Block-based static timing analysis with uncertainty", From the conference ICCAD '03 in San Jose, CA (Nov. '03), (Nov. 13, 2003),607-614.

Tseng, Ken et al., "Cell model creation for statistical timing analysis", Available online httQ:I /www.eetimes.com/showArticle.jhtml?article ID= 1901 00003, (Jul. 3 2006), 1-5.

Hong, Jerry et al., "An LLC-OCV Methodology for Statistic Timing Analysis", From IEEE 2007, (Apr. 27, 2007), 1-4.

Nardi, A et al., "Use of Statistical Timing Analysis on Real Designs", From Design, Automation & Test in EuroQe Conference & Exhibition, 2007., (Apr. 20, 2007), 1-6.

Mutlu, A Than et al., "An Exploratory Study on Statistical Timing Analysis and Parametric Yield Optimization", From ISQED '07. 8th International SymQosium on, Date: Mar. 26-28, 2007,677-684.

* cited by examiner

SEMICONDUCTOR HOLD TIME FIXING

RELATED APPLICATIONS

This application claims the benefit of U.S. provisional patent applications "Semiconductor Hold Time Fixing" Ser. No. 61/734,932, filed Dec. 7, 2012. The foregoing application is hereby incorporated by reference in its entirety.

FIELD OF ART

This application relates generally to design automation and more particularly to design analysis for semiconductor hold time fixing.

BACKGROUND

A wide variety of design and computer-aided methods are utilized to implement state-of-the art electronic systems. Among the many tasks allotted to the design process and systems designers, few are more critical than decisions involving significant system and implementation tradeoffs during the design and layout processes. For example, overall system requirements can dictate balancing the system's performance, physical size, architectural complexity, power consumption, heat dissipation, fabrication complexity, cost, and other design criteria. Any one of such system and implementation tradeoffs made can cause profound impacts on the resulting system. The electronic systems in question can be implemented using a variety of techniques including custom-designed solutions (e.g. purpose-built circuits), or can be based on existing parts or libraries such as application-specific integrated circuits (ASIC), field programmable gate arrays (FPGA) and their variants, consumer off-the-shelf (COTS) components, or even microprocessors. Custom designed or ASIC-based systems are constructed to meet the most stringent systems requirements, and may consist of a variety of circuits and circuit types. While both custom and ASIC-based circuits do offer significant performance and size advantages, among other benefits, when compared to other circuit designs, they pose significant design and implementation challenges, including the placement of circuits and the wiring of power, ground, clock, and input/output signals.

Custom and ASIC-based systems contain many large, functional blocks of circuitry. These blocks, often referred to as macrocells, must be placed and connected with other blocks of circuitry comprising the rest of the integrated circuit system. These factors permit the reduction of design complexity, allow for circuit reuse, and provide a host of other benefits. These macrocells perform specific tasks, such as mathematical operations, and typically possess large numbers of active devices and input/output connections. Both the macrocells and their support wiring consume valuable real estate on the semiconductor chip. The macrocells and their many connections must be placed within and among other blocks of circuitry on the semiconductor chip. As with any circuit placement and routing, this placement of macrocells represents a complex design task, which is further complicated by many and often-competing system requirements. The placement cannot be arbitrarily performed, as the placement of macro cells must be balanced with system requirements, physical space availability, signal requirements, and other design criteria. The fact that macrocells are frequently clustered together logically—and often physically—on the semiconductor chip complicates the placement problem. This physical and logical clustering limits placement options for other required circuits and consumes valuable semiconductor chip real estate. Also, the placement of macrocells and other blocks of logic has a profound influence on system performance. Thus, many factors including timing must be considered while designing semiconductor chips.

SUMMARY

Techniques implemented to improve placement and routing of macrocells are used to enhance hold-time fixing on semiconductor chips. Placement regions are allocated in the vicinity of macrocells early in the placement process so that hold-time fixing is undertaken at a later time. In addition, global routing is performed to wire global cells. Within the global cells, wiring tracks are assigned to permit detailed routing. The design is evaluated to determine hold-time violations. Nets within the design can be ordered such that nets in which hold-time violations have been identified are wired later in the wiring process than non-violating nets. Such later wiring results in the delay of nets with hold-time violations, thus eliminating the violation and the commensurate need for hold buffers. A computer-implemented method for design analysis is disclosed comprising: obtaining a design; evaluating the design based on ideal clocks; estimating hold-time requirements for the design based on the ideal clocks; allocating placement regions for the design wherein the placement regions are to be used during hold-time fixing; and performing hold-time fixing on the design. In embodiments, the number of buffers required is estimated and areas for the placement regions are based on the number of buffers. In some embodiments, required routing resources for the buffers are reserved.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Modern semiconductor chips are composed of many circuits and circuit types. In order to reduce design complexity and streamline the design process, large, specialized, often-reusable circuit blocks, called macrocells, may be employed. These macrocells add certain functionalities and capabilities to a semiconductor chip. For example, macrocells can consist of logical blocks, mathematical blocks, specialized controllers, memories, and other such features. Beyond the variety of features allowed on a macrocell, these cells can be further adapted for use on a particular semiconductor chip by adding so-called regular logic. This logic type, also called "glue logic," permits the interconnection of multiple macrocells of various types, the creation of small, random blocks of logic, or the realization of new circuits and functions not presently provided by the macrocells.

Choosing macrocells, designing regular logic cells, and determining optimal circuit wiring are the key steps in the circuit design of a modern semiconductor chip. After the design phase is complete, circuits are situated within the space provided by the semiconductor chip and wired into place, thus producing the physical chip. These processes—situating circuits and wiring them together—are called "placement" and "routing" respectively. Because of the finite area available on the semiconductor chip and the limited number of potential wiring paths, the processes of placement and routing are highly complex and often problematic. Numerous techniques exist for placement and routing, each having its relative advantages and disadvantages. In any case, the result of placement and routing must be a fully wired, fully functioning design in order for the semiconductor chip to prove successful.

One critical requirement of placement and routing is that signals must arrive at the correct circuits at the proper time. In order to meet this requirement, input signals must be held long enough to allow the receiving circuits to read the input signals accurately. This critical time, called hold time, is a crucial component in ensuring a properly functional semiconductor chip. Often, hold-time analysis includes evaluating that a signal is maintained at a valid level until a clock correctly captures the signal value into storage. Hold-time violations occur when a receiving circuit attempts to read a given input signal that is not valid at the time of the attempted read. Though fixing hold-time violations is possible, such fixing is very difficult to achieve because both macrocell and regular logic placement, along with the placement of signal-transfer wiring circuits, directly impact signal hold time. Hold time is particularly critical for signals that are globally wired around the semiconductor chip. Hold-time violations are often corrected by introducing buffers into the signal paths. Returning late in the placement and routing processes to fix hold-time violations is difficult because chip real estate has already been consumed by macrocells and regular logic, thus leaving no room for hold-time fixing buffers. Moreover, wiring channels may have already been utilized, rendering wiring solutions to hold-time violations impossible or impractical.

In the disclosed concept, a system is shown comprising controlled placement and routing of macrocells and regular logic in order to fix hold-time violations. Before either macrocells or regular logic are placed, a given design is analyzed to determine clock tree structure constraints and enable hold-fixing scenarios. Such clock tree structure and hold fixing placement is performed early in the design process. Decisions about clock tree structure synthesis and hold fixing placement are based on ideal clocks. The disclosed system of early placement allows for hold buffers are that added to fix hold-time violations discovered later in the placement process. As a result, placement and routing congestion in the vicinities of macrocell input/output connections is reduced, as are design rule check (DRC) violations.

Further disclosed is a hold-fixing concept based on the ordering of wiring nets. A given semiconductor chip design is divided into sections including global cells. Global routing of the semiconductor chip design is performed to wire the global cells. The design of the semiconductor chip is assigned tracks within the global cells in order to accomplish detail routing. The design is analyzed to determine hold-time violations, and nets within the design for detail routing are ordered based on hold-time violations. Wiring of the nets then proceeds based on the ordering—the nets with hold-time violations are wired later. Later wiring causes the nets determined to have hold-time violations to be longer, thus introducing delay and correcting the hold-time violations. Such correction obviates the need for hold-time fixing buffers for those nets.

Figure 1:
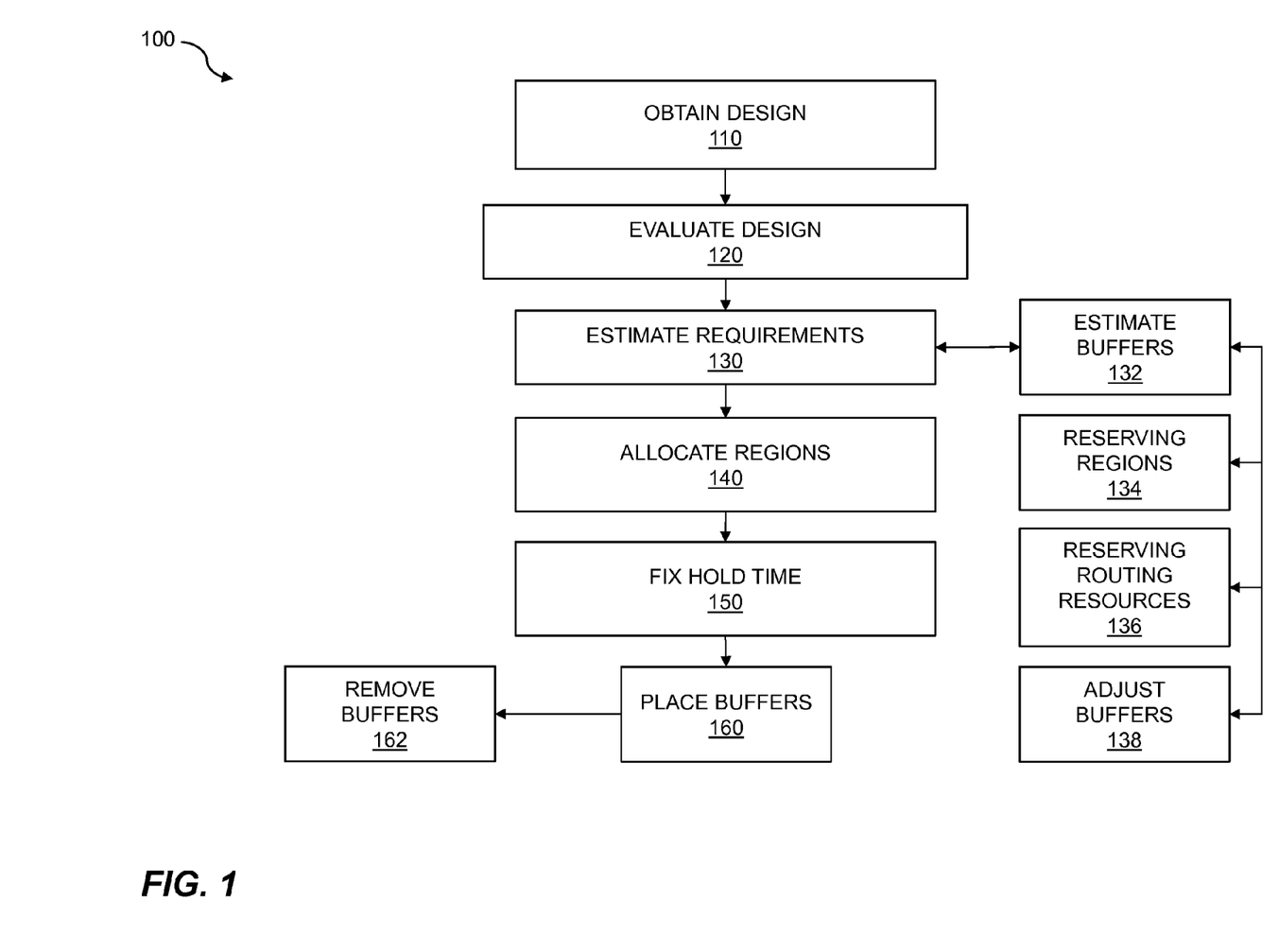
FIG. 1 is a flow diagram for evaluating design.

FIG. 1 is a flow diagram for evaluating design. A flow 100 for hold-time fixing of semiconductor chips is described. The flow 100 includes obtaining a design 110 for a semiconductor chip. The design may comprise macrocells, regular logic, and wiring requirements. The design may come from an electronic design automation (EDA) tool or other appropriate means.

The flow 100 includes evaluating the design 120 based on ideal clocks. The ideal clocks can be used to source clock tree structures and to enable hold-fixing scenarios before the placement of macrocells and regular logic, and before the assignment of wiring tracks. Such sourcing and assignment can occur prior to incremental global placement, a potential part of a placement stage for a chip. The placement stage can be part of a typical design process for a semiconductor chip.

The flow 100 includes estimating requirements 130, including the estimating of hold-time requirements, for the design based on the ideal clocks. For example, design evaluation 120 can determine that a large number of macrocells in a given area of the semiconductor chip possess a large number of input/output pins with hold-time violations. The estimating can determine the requirements for fixing the hold-time violations of the various input/output signals. Hold-time violations are corrected by the addition of buffers. The flow 100 includes estimating a number of buffers 132 required for hold-time fixing. Buffers added for fixing hold-time violations often must be placed onto the semiconductor chip. The flow 100 includes reserving regions of the chip for buffer placement 134. These regions may be located in near proximity to the macrocells possessing input/output pins with hold-time violations. Any buffers added for the purposes of hold-time fixing may be connected to the signals which require hold-time fixing. Wiring for buffers may require that tracks be assigned to such wiring. The flow 100 includes reserving required routing resources 136 for the number of buffers present. As a placement process continues, greater detail about the locations of global cells, macrocells, and regular logic, as well as information about wiring requirements may be obtained. Placement of components on the semiconductor chip may be an iterative process. As a result, more detail about hold-time violations and hold-time fixing may emerge. The flow 100 includes incrementally adjusting buffering 138 to improve hold times. Buffers may be introduced to accomplish the hold-fixing. Further, buffers may be made larger or smaller to increase or reduce delay, respectively.

The flow 100 includes allocating placement regions 140 for the design wherein the placement regions are to be used during hold-time fixing. Regions of the semiconductor chip are allocated for hold-time buffers to fix hold-time violations of various signals. Regions are assigned based on a concentration of macrocells, on concentrations of input/output pin hold-time violations, and the like. Region assignment is based on adjacency to macrocells or input/output pins and the placement region is based on the number of buffers estimated to be required for hold-fixing.

The flow 100 includes performing hold-time fixing 150 on the design. Hold-time fixing may be accomplished by allocating buffers, by allocating wiring, or both. The decision to allocate buffers, wiring, or a combination of both depends on the extent of a given hold-time violation, the amount of buffering required, the availability of wiring tracks, and the like.

The flow 100 includes placing buffers 160 as part of the hold-time fixing. Buffers are placed in regions allocated 140 for hold fixing. Buffer sizes may be made larger to increase hold-time fixing or made smaller to decrease hold-time fixing. In embodiments, the hold-time fixing is performed before the placing of buffers 160. For example, hold-fixing may determine the sizes of the buffers required for the hold-fixing process prior to determining where on the semiconductor chip those buffers may be placed. The flow 100 includes removing buffers 162 or incrementally removing space remaining in the placement regions that were allocated. Space removed from the placement regions allocated 140 may be used for other placement requirements such as placement of regular logic cells, wiring tracks, and the like. Various steps in the flow 100 may be changed in order, repeated, omitted, or the like without departing from the disclosed inventive concepts. Various embodiments of the flow 100 may be included in a computer program product embodied in a non-transitory computer readable medium that includes code executable by one or more processors.

Figure 2:
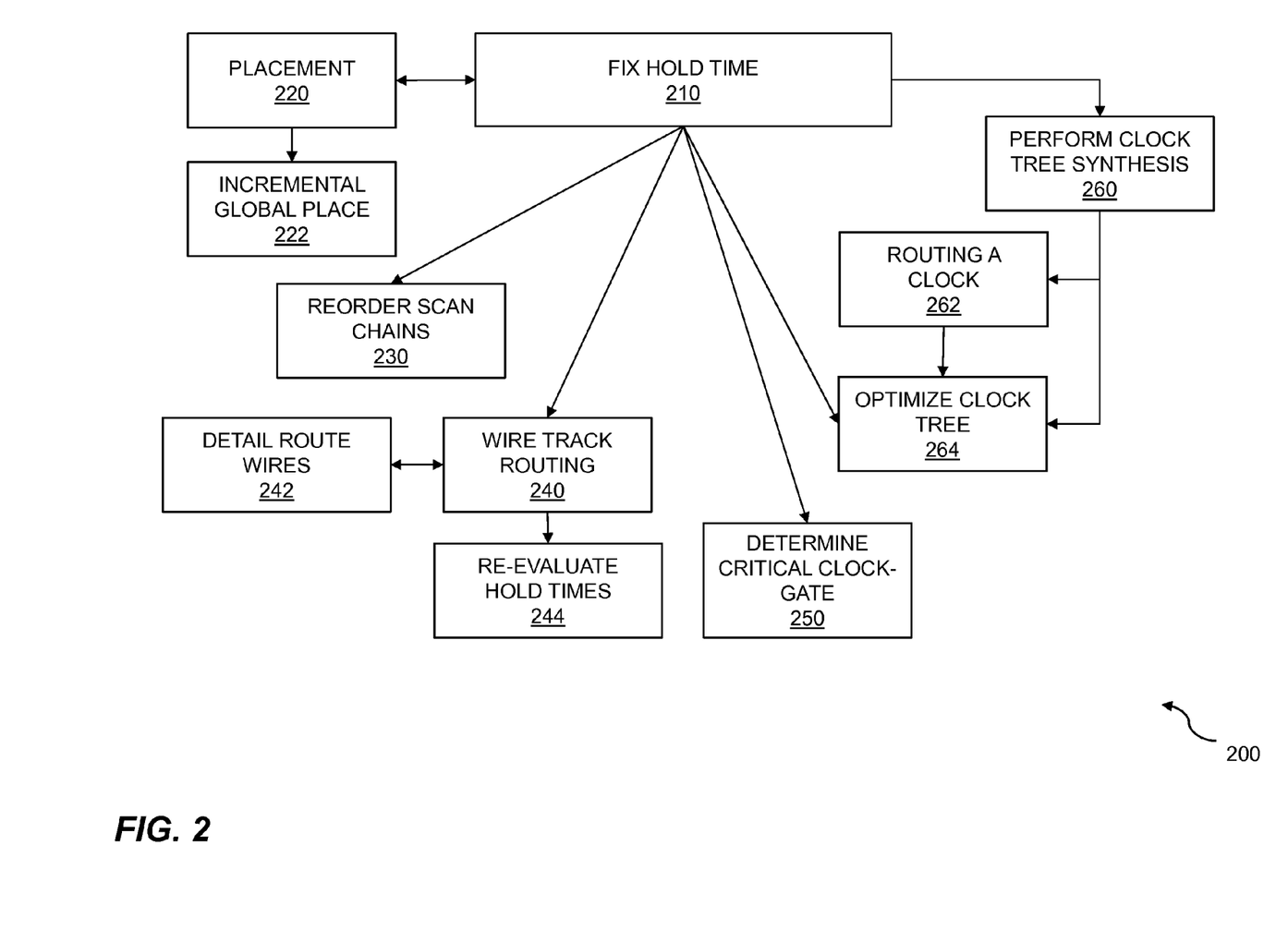
FIG. 2 is a flow diagram for hold time fixing.

FIG. 2 is a flow diagram for hold time fixing. A flow 200 may continue from or be part of the previous flow 100. In some embodiments, the flow 200 stands on its own and works from a pre-existing semiconductor chip design or another design. The flow 200 includes fixing hold times 210. Individual hold-fixing techniques may be employed, or a plurality of hold-fixing techniques may be used together. The flow 200 includes performing placement 220. Placement of general cells, macrocells, and regular logic may have a significant effect on signal paths, and thus arrival times, of key signals. The hold-time fixing 210 may be performed during the performing of placement 220. In embodiments, buffers are inserted in the placement regions and connected in signal paths in order to fix hold-time violations. Placement 220 may be part of a global placement scheme, an iterative placement scheme, or the like. The placement may be based on buffers that are inserted as part of the hold-time fixing. Buffers may be inserted into a signal path to delay a given signal that propagates along the path. The placement may include incremental global placement 222 in which placement of global cells may be performed while considering the placement of other global cells. In embodiments, other placement techniques can be employed such as iterative global placement. The hold-time fixing 210 may be performed before incremental global placement 222. Incremental adjustment may include upsizing, downsizing, removing, or adding buffers.

The flow 200 includes reordering scan chains 230. The reordering of scan chains may change the arrival times of certain signals to particular portions of a semiconductor chip and may, therefore, fix hold-time violations. The flow 200 includes reordering scan chains 230 after the hold-time fixing 210. The flow 200 includes wiring of track routing 240. Wire on semiconductor chips is known to introduce delay into a signal path. Delay of a particular signal may thus depend on a particular route taken by a given wire. The flow 200 includes wiring track routes 240 for the design. The flow 200 includes detail routing wires 242 for the design. Detailed wire-routing information may permit calculation of signal paths throughout a semiconductor chip. The wiring of track routes for hold-time critical nets may be performed later than the wiring of nets without hold-time violations. For example, wiring of hold-time critical nets may fix hold-time violations by delaying critical signals using longer wire runs on the paths taken by the critical signals. The flow 200 includes re-evaluating hold times 244 once the wiring of track routes 240 is accomplished. Reevaluation may be used to confirm that hold-time violations have been fixed and that other hold-time violations have not been inadvertently caused. If additional hold-time violations result from wiring, a reevaluation may lead to an updated detailed routing plan for wire placement. The flow 200 may further comprise determining critical clock-gate enable paths 250. Since a clock signal may be ubiquitous across a semiconductor chip, paths for a clock may be chosen early in the placement and routing processes. Clock routing choices may have an impact on the arrival times of clock signals. Clock-gates can be enabled throughout the semiconductor chip. The determining of the critical clock-gate enable paths 250 is used in the hold-time fixing 210.

The flow 200 includes performing clock-tree synthesis 260 for the design. Clock signals are routed widely across a semiconductor chip using a tree structure. Clock structures may be synthesized early in the placement and routing processes. In embodiments, hold-fixing for the clock tree structures is based on ideal clocks. The flow 200 includes routing a clock 262 for the design. The routing of a clock may have significant impact on clock performance, including delay, skew, and other parameters. The flow 200 includes optimizing a clock tree 264 for the design and may include optimization for power and timing as well as buffering. Various steps in the flow 200 may be changed in order, repeated, omitted, or the like without departing from the disclosed inventive concepts. Various embodiments of the flow 200 may be included in a computer program product embodied in a non-transitory computer readable medium that includes code executable by one or more processors.

Figure 3:
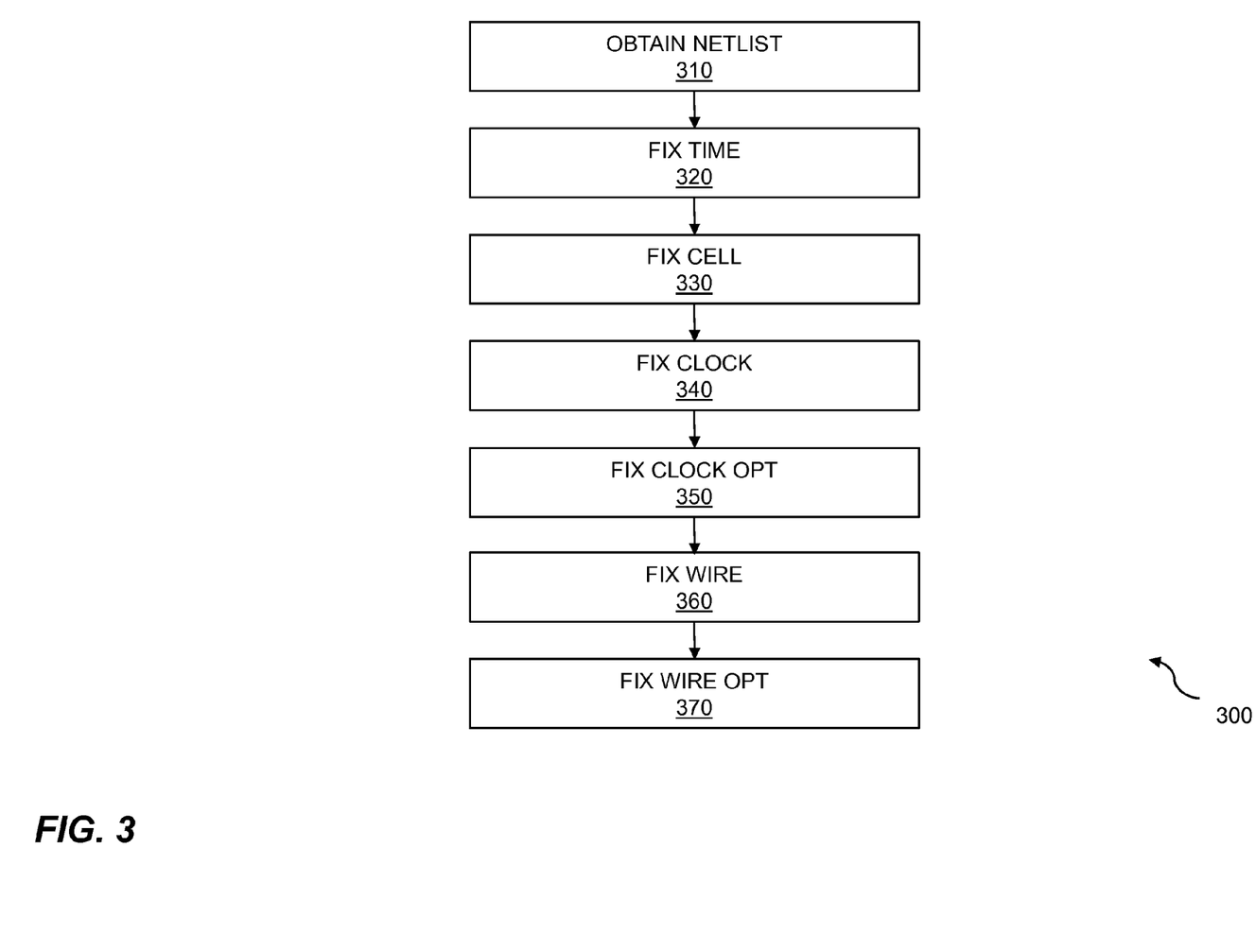
FIG. 3 is a flow diagram for design automation usage.

FIG. 3 is a flow diagram for design automation usage. A flow 300 may continue from or be part of the previous flow 100 or the previous flow 200. In some embodiments, the flow 300 stands on its own and works from pre-existing designs. The flow 300 includes obtaining a netlist 310. A netlist describes the required connections for a semiconductor chip. A delay model may be generated from the netlist. The delay model indicates estimated times for signals to arrive at various locations across the semiconductor chip. A delay model may identify early potential hold-time violations within a design. The flow 300 continues with fixing hold-time violations 320. Fixing may be based on a constant model for signals and clocks, idealized clocks, and the like. Hold-fixing scenarios may be determined and activated prior to placement. The flow 300 continues with fixing cells 330. Early hold-fixing may take into account global models of clocks and signals. In embodiments, early hold-fixing includes adding buffers, removing buffers, resizing buffers, and the like. The flow 300 continues with fixing the clock 340. Constraints on a clock tree structure may be determined prior to placement. Clock fixing may be based on ideal clocks. The flow 300 continues with fixing clock optimization 350. Insertion delay of clocks and arrival time at clock gates may be optimized and buffered or rewired. Primary buffering may be performed, and a clock tree may be optimized for power and timing. In embodiments, fixing clock optimization is part of global hold fixing and track hold fixing. The flow 300 continues with fixing wires 360. Wires introduce delay into a signal path due to physical parameters, in some instances capacitance, resistance, and inductance. Wires may be manipulated in such a way as to fix hold-time violations. The flow 300 continues with executing fix wire optimization 370. Fix wire optimization may be performed by choosing shorter or longer wire paths, by introducing buffers, adding buffers, removing buffers, scaling buffers, and the like. Fix wire optimization may also be used to reduce cell and wiring congestion by removing early hold buffers to create low density areas near macrocell input/output pins. Various steps in the flow 300 may be changed in order, repeated, omitted, or the like without departing from the disclosed inventive concepts. Various embodiments of the flow 300 may be included in a computer program product embodied in a non-transitory computer readable medium that includes code executable by one or more processors.

Figure 4:
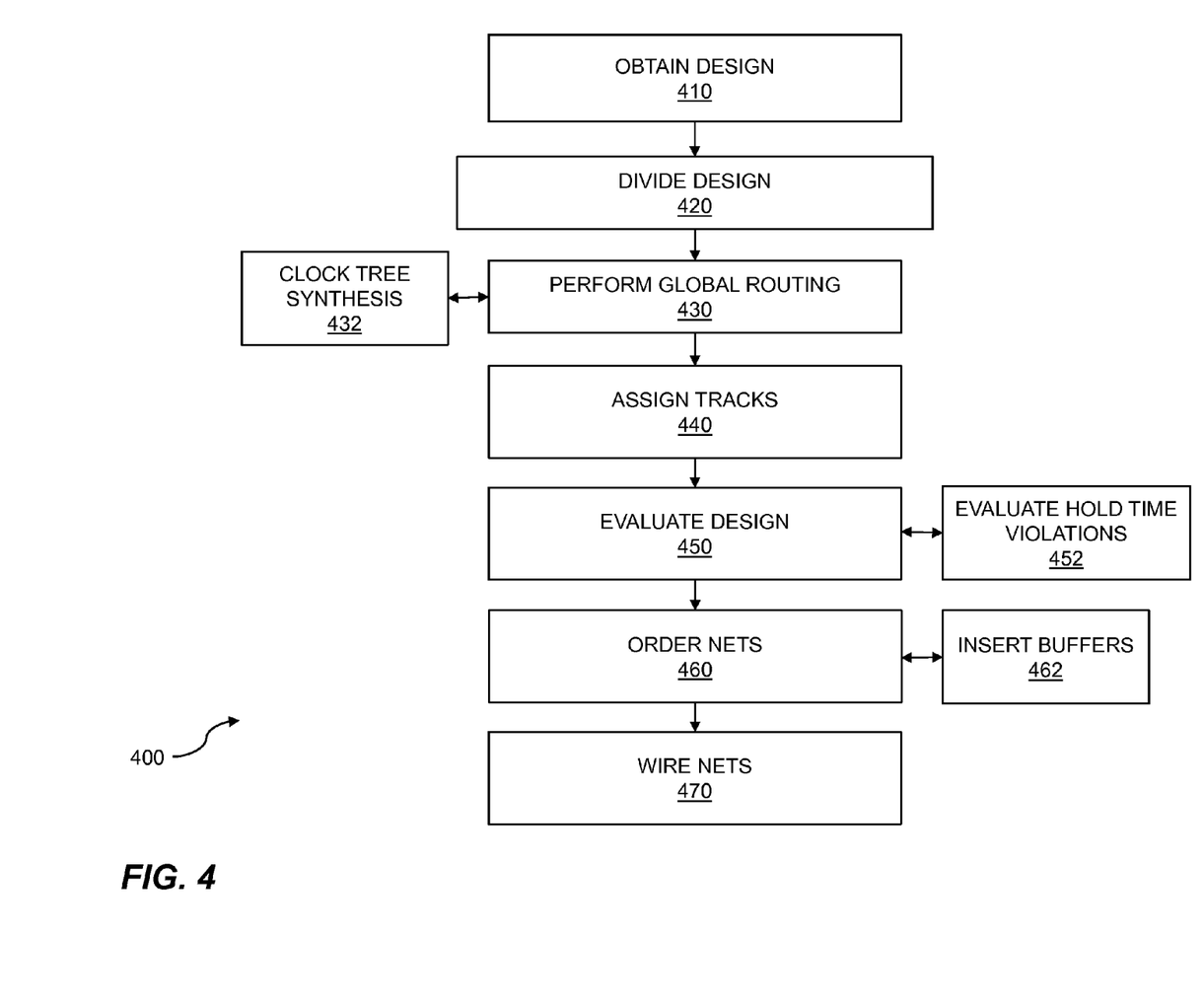
FIG. 4 is a flow diagram for wiring to fix hold times.

FIG. 4 is a flow diagram for wiring to fix hold times. A flow 400 may continue from or be part of the previous flow 100, the previous flow 200, or the previous flow 300. In some embodiments, the flow 400 may stand on its own and work from a pre-existing design. The flow 400 includes obtaining a design 410 for wiring a semiconductor chip. In embodiments, a design automation tool or other means is used to generate a design. In embodiments, a design comprises information on macrocells, regular logic, and wiring requirements. The flow 400 continues with dividing the design 420 into sections including global cells. Global cells may comprise macrocells, regular logic, or other circuits. The dividing of a design into sections may be based on logical decisions, such as data locality and other parameters key to a semiconductor chip. The flow 400 continues with performing global routing 430 of the design in order to wire the global cells. Global routing may interconnect the various global cells, macrocells, regular logic, and the like using conductors appropriate to a specific semiconductor chip. Interconnection decisions may be based on accepted design practices, and may choose from a variety of conductors and wiring layers. Key among global routing's tasks is clock tree synthesis 432. Because clock signals are typically routed to many or all sections of a semiconductor chip, routing of a clock tree takes high or highest priority in some embodiments.

The flow 400 continues with assigning tracks 440 within the global cells for detail routing. While global routing may distribute clock signals and input/output signals widely across a semiconductor chip, detail routing may include connecting global signals to specific inputs or outputs of macrocells and regular logic. Wiring tracks within the macrocells and regular logic may be assigned for detail wiring. The flow 400 continues with evaluating the design 450 to determine hold time violations. As mentioned previously, physical characteristics of conductors on a semiconductor chip may introduce delay due to factors such as inherent resistance, capacitance, and inductance, among others. A routing design may be evaluated to determine timing details for key signals such as clocks, input/output signals, and the like. The flow 400 may further comprise re-evaluating the design for hold-time violations 452 present after detail routing. Such evaluation is critical in determining which signals have hold-time violations due to interconnection assignments. The flow 400 continues with ordering nets 460 within the design for detail routing. Nets may be ordered based on which nets have hold-time violations, which nets do not have hold-time violations, and the like. The ordering of nets may be used to determine hold-fixing strategies designed to rectify hold-time violations. The flow 400 includes inserting buffers 462 to fix hold-time violations. Buffers may be inserted into a signal path at various locations along the path. For example, buffers may be added in the vicinity of a macrocell input pin whose signal may have been found to exhibit a potential hold-time violation. The flow 400 continues with wiring the nets 470 based on the ordering wherein the nets with hold-time violations are wired later. Nets without hold-time violations may be wired first, while nets found to have hold-time violations may be wired later. Wiring nets which have hold-time violations later may avoid the hold-time violation. Such later wiring may obviate the need for hold buffers, thus freeing space for placement of other circuits and wiring. Various steps in the flow 400 may be changed in order, repeated, omitted, or the like without departing from the disclosed inventive concepts. Various embodiments of the flow 400 may be included in a computer program product embodied in a non-transitory computer readable medium that includes code executable by one or more processors.

Figure 5A:
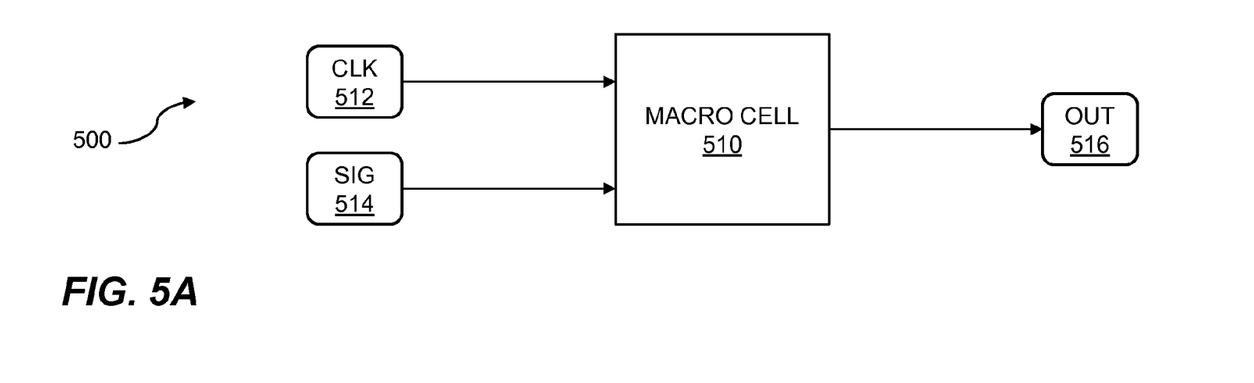
FIG. 5A is an example logic block diagram.

FIG. 5A is an example logic block diagram. In logic block diagram 500, a macrocell 510 is shown with inputs clock CLK 512 and signal SIG 514, and output OUT 516. In embodiments, any number of inputs and outputs can be connected to a given macrocell 510. The arrival time of clock CLK 512 and the hold time of signal SIG 514 are critical to proper operation of macrocell 510. Clock constraints can be used as part of the estimating of hold-time requirements. For example, given a set of clock constraints, signal SIG 514 may be required to arrive within a specified time, otherwise, a hold-violation exists for signal SIG 514.

Figure 5B:
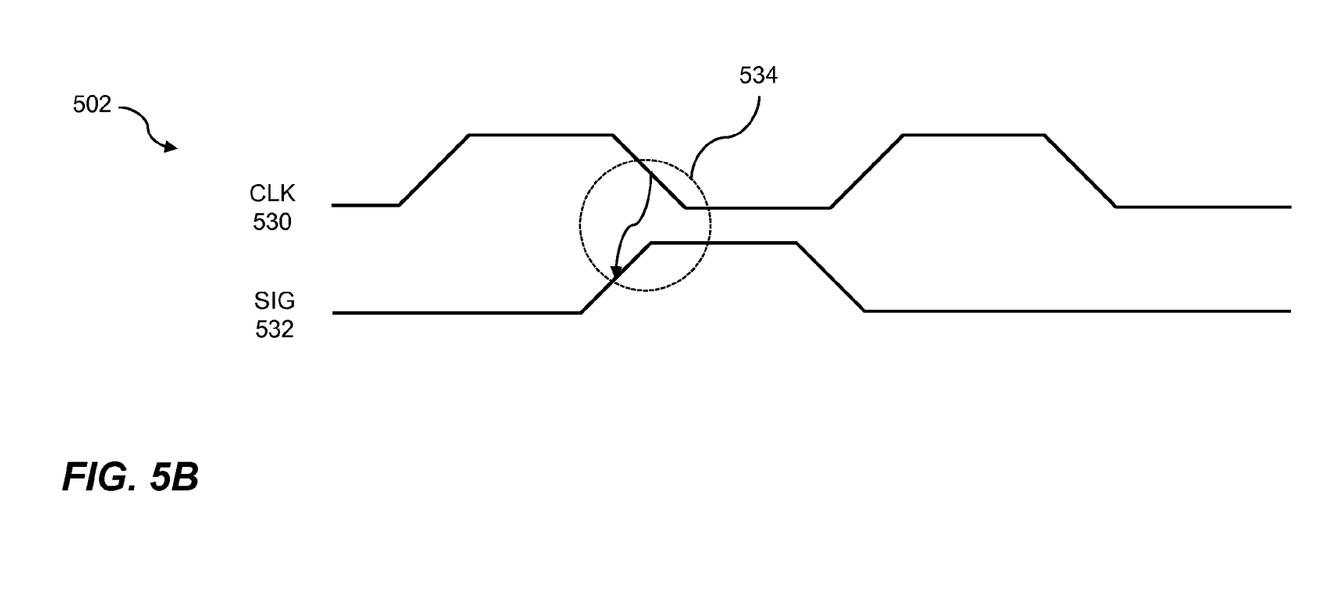
FIG. 5B shows example waveforms needing hold-time fixing.

FIG. 5B shows example waveforms needing hold-time fixing. In waveform diagram 502, waveforms are shown which include a clock CLK 530 and a signal SIG 532. In the example shown, signal SIG 532 is operated on during the active low phase of clock CLK 530. In order for the correct value of signal SIG 532 to be captured, it must be held until the active low phase of clock CLK 530. However, signal SIG 532 transitions before clock CLK 530 has become low. Thus, a negative hold time 534 may be determined; a hold-time violation exists in the example.

Figure 6A:
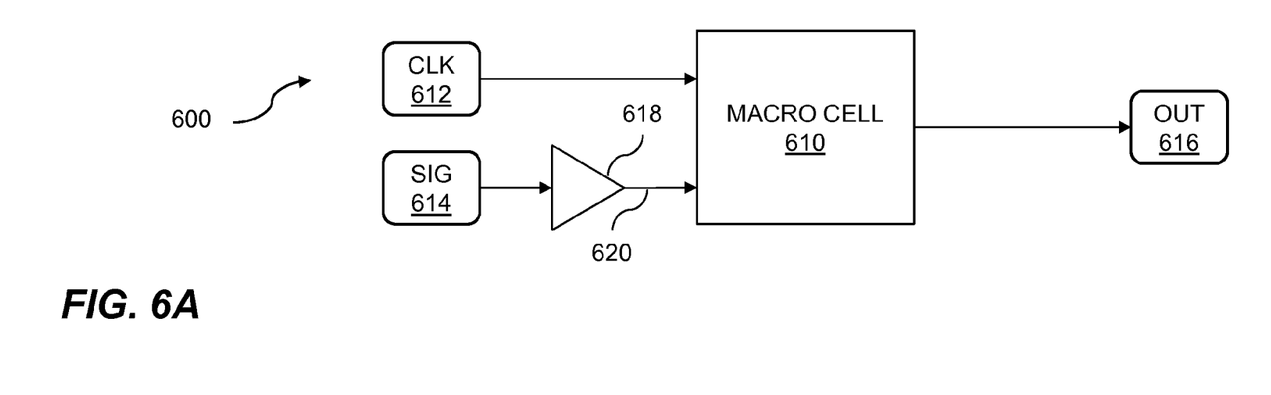
FIG. 6A is an example logic block diagram with hold time fixed.

FIG. 6A is an example logic block diagram with hold time fixed. In logic block diagram 600, a macrocell 610 is shown with the inputs clock CLK 612 and signal SIG 614. The hold-time of signal SIG 614 is fixed by adding a hold-time fixing buffer 618 to produce hold-time fixed signal 620. Macrocell 610 also has an output OUT 616. Clock constraints may have been used as part of the estimating of hold-time requirements, and may be used to scale the size of hold-time fixing buffer 618.

Figure 6B:
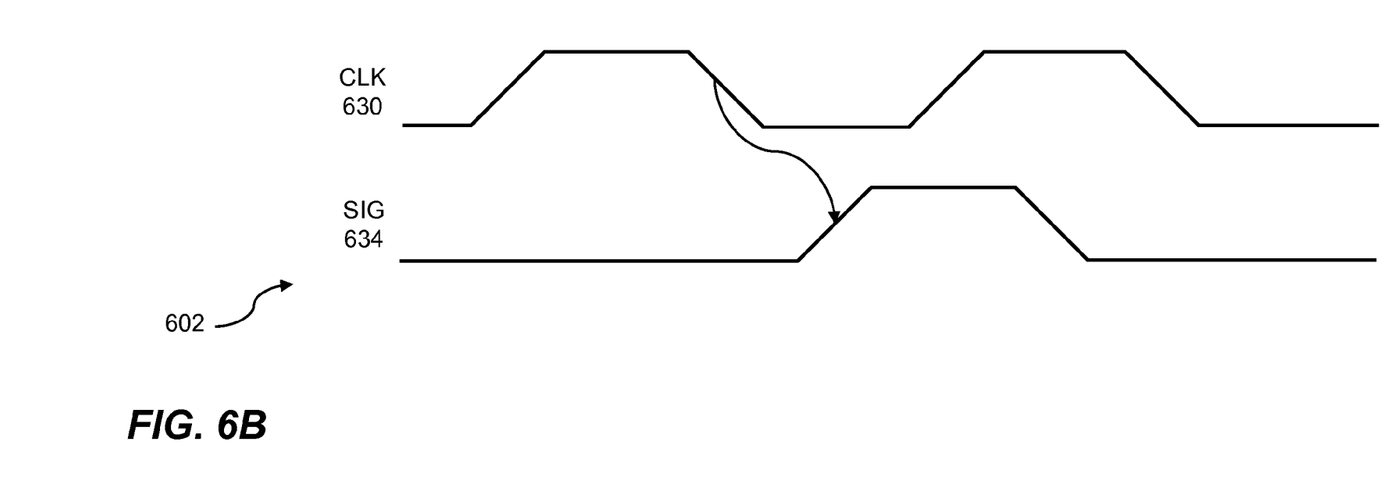
FIG. 6B shows example waveforms with hold times fixed.

FIG. 6B shows example waveforms with hold times fixed. In waveform diagram 602, waveforms are shown which include a clock CLK 630 and a hold-time fixed signal SIG 634. In the example shown, signal SIG 634 is operated on during the active low phase of clock CLK 630. In order for the correct value of signal SIG 634 to be captured, it must be held until the active low phase of clock CLK 630. In the example shown, signal SIG 634 does indeed transition after clock CLK 630 is low. Thus, a positive hold time exists in the example, and signal SIG 634 is hold-time fixed.

Figure 7:
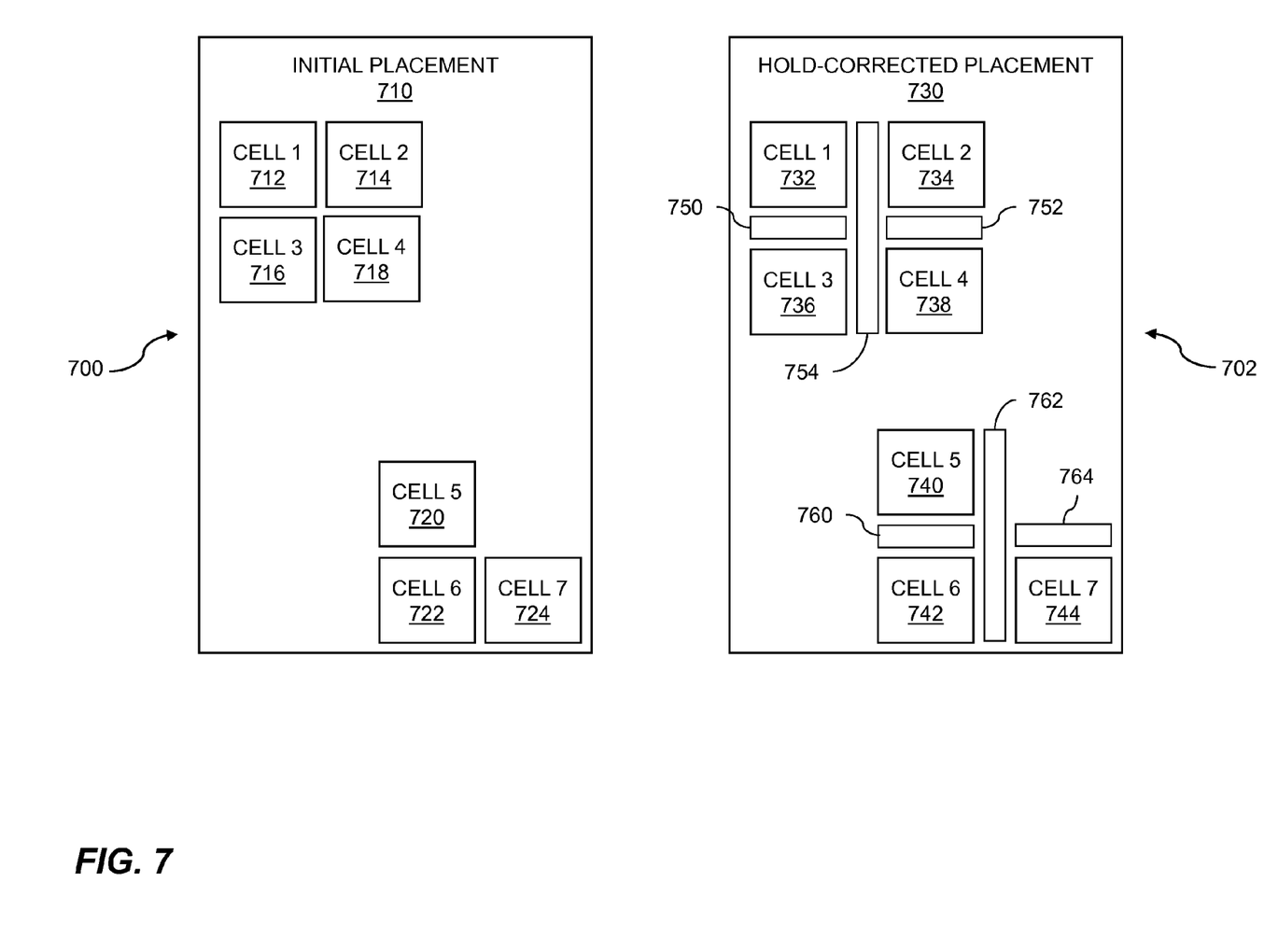
FIG. 7 is an example placement without and with placement regions.

FIG. 7 is an example placement without and with added placement regions. In layout example 700, various cells may be placed as part of an initial placement 710. The cells may comprise global cells, macrocells, regular logic, and the like. Placement objects may be clustered. For example, Cell 1 712, Cell 2 714, Cell 3 716, and Cell 4 718 form one cluster, while Cell 5 720, Cell 6 722, and Cell 7 724 form a second cluster. In embodiments, any number of cells may be clustered. Cells may be clustered to ease placement and routing tasks, because of locality of data, or to accomplish other design and implementation goals. As part of a hold-fixing strategy, regions are added to a placement. In layout example 702, various cells and regions are placed as part of a hold-corrected placement 730. The cells may comprise global cells, macrocells, regular logic, and the like. Regions may comprise areas on a semiconductor chip, which are reserved for hold-fixing buffers, hold-fixing wiring, and the like. For example, Cell 1 732, Cell 2 734, Cell 3 736, and Cell 4 738 may form one cluster with regions 750, 752, and 754. Similarly Cell 5 740, Cell 6 742, and Cell 7 744 may form a second cluster with added regions 760, 762, and 764. In embodiments, the allocating of placement regions to be used during hold-time fixing allows for access to pins on blocks within the design. In placement example 702, the cells may correspond to global blocks, macrocells, regular logic, and the like. In embodiments, the performing of hold-time fixing avoids displacement of previously placed blocks. Hold-time fixing buffers and/or wiring may be added within the regions without disturbing other circuitry placed outside the cells and regions.

Figure 8:
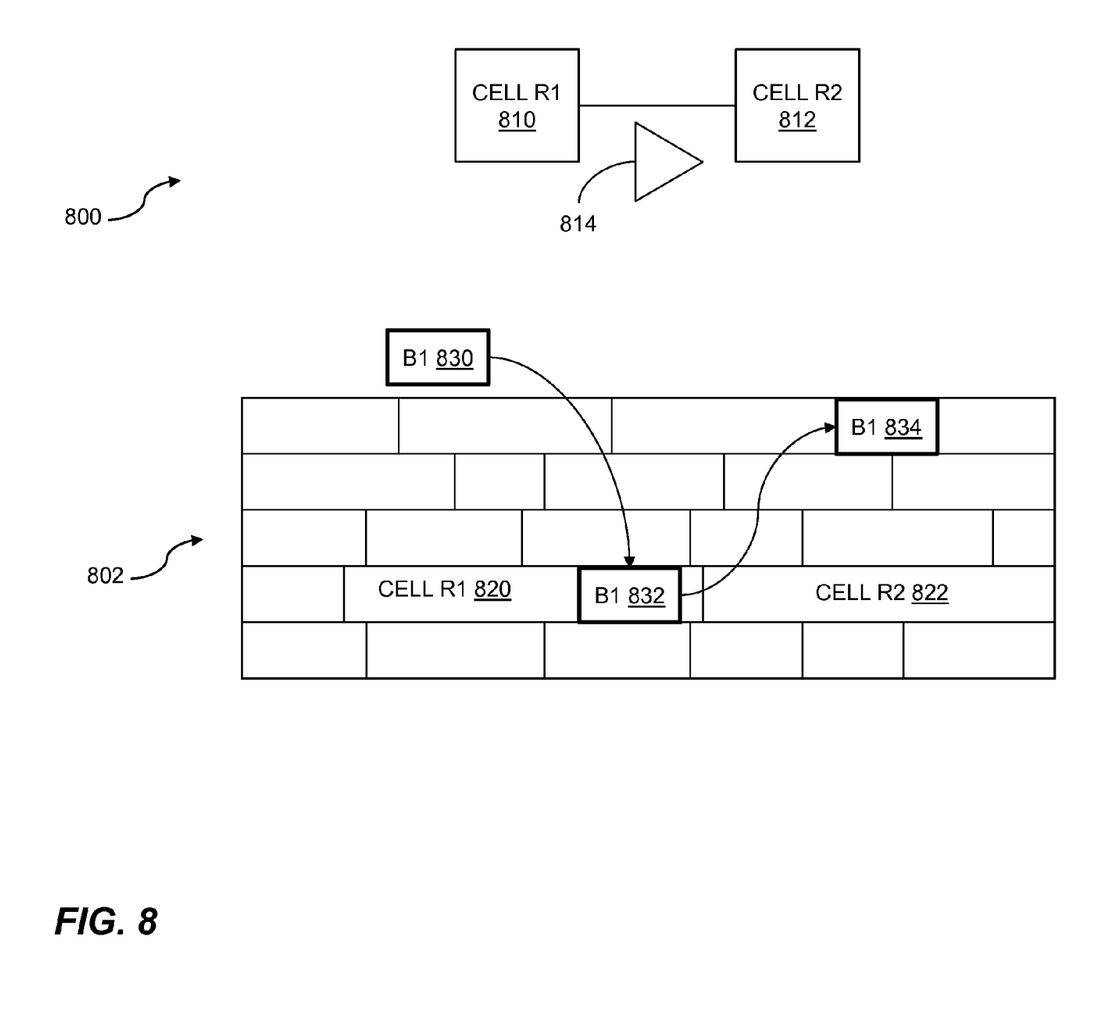
FIG. 8 is an example of cells with a buffer inserted.

FIG. 8 is an example of cells with a buffer inserted. In circuit example 800, a simple circuit is shown comprising two cells Cell R1 810 and Cell R2 812 with a connection between them. The diagram 800 includes placing and wiring buffers as part of the hold-time fixing. An example buffer 814 is inserted in line with cells 810 and 812 to correct a hold-time violation. An example layout 802 is also shown. The layout 802 comprises many cells, including Cell R1 820 and Cell R2 822. Buffer B1 830 is to be logically inserted between cells 820 and 822, and it is shown schematically as buffer B1 832. However, in the example layout 802, insufficient physical space is available between cells 820 and 822. Buffer B1 834 is placed in an available spot on the chip. Buffer B1 834 is then wired inline between cells 820 and 822 to provide hold fixing.

Figure 9:
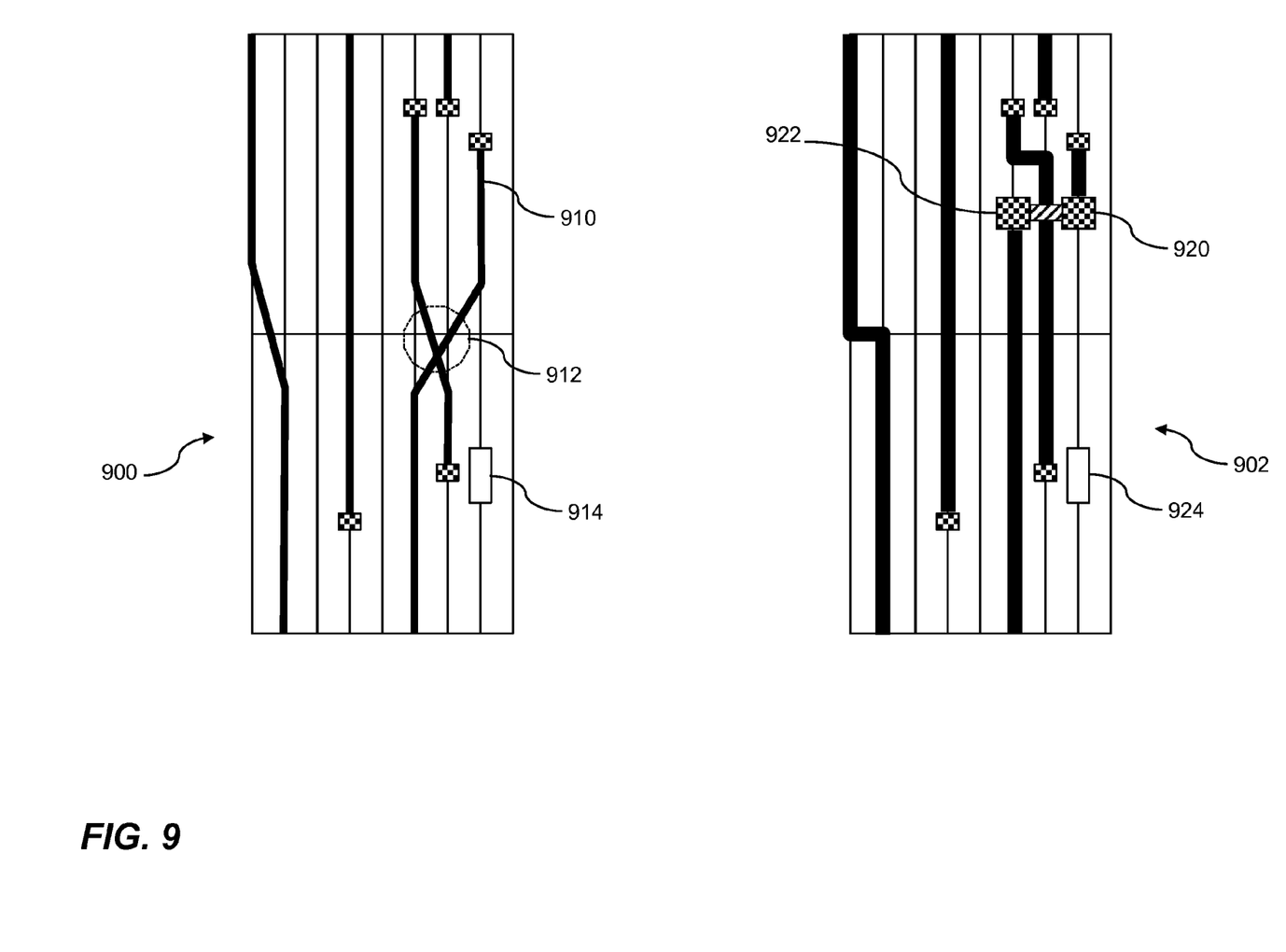
FIG. 9 is an example track assignment.

FIG. 9 is an example track assignment. A track assignment shows how various signals may be connected with wire and vias. The example 900 shows a desired configuration of tracks wired to various nets. Of the connections shown in the diagram 900, a net 910 is determined to be a hold-critical net. In addition, a net 910 crosses another net at a crossing point 912. An obstruction 914 represents a circuit or other impediment preventing the net 910 from simply being routed around the net it is crossing at the crossing 912. An example diagram 902 shows a hold-correcting routing of various nets. The net 910 has been found previously to be hold-critical, so it may be ordered differently from other nets. For example, the net 910 is wired after the net it was crossing at the junction 912. Thus, vias (920 and 922) are added so that the net 910 may go "up and over" the net it is crossing. The added vias (920 and 922) and the wire between them are added to fix a hold-time violation on net 910. As before, an obstruction 924 represents a circuit or other impediment preventing the net 910 from simply being routed around the net it was previously crossing at a junction 912.

Figure 10:
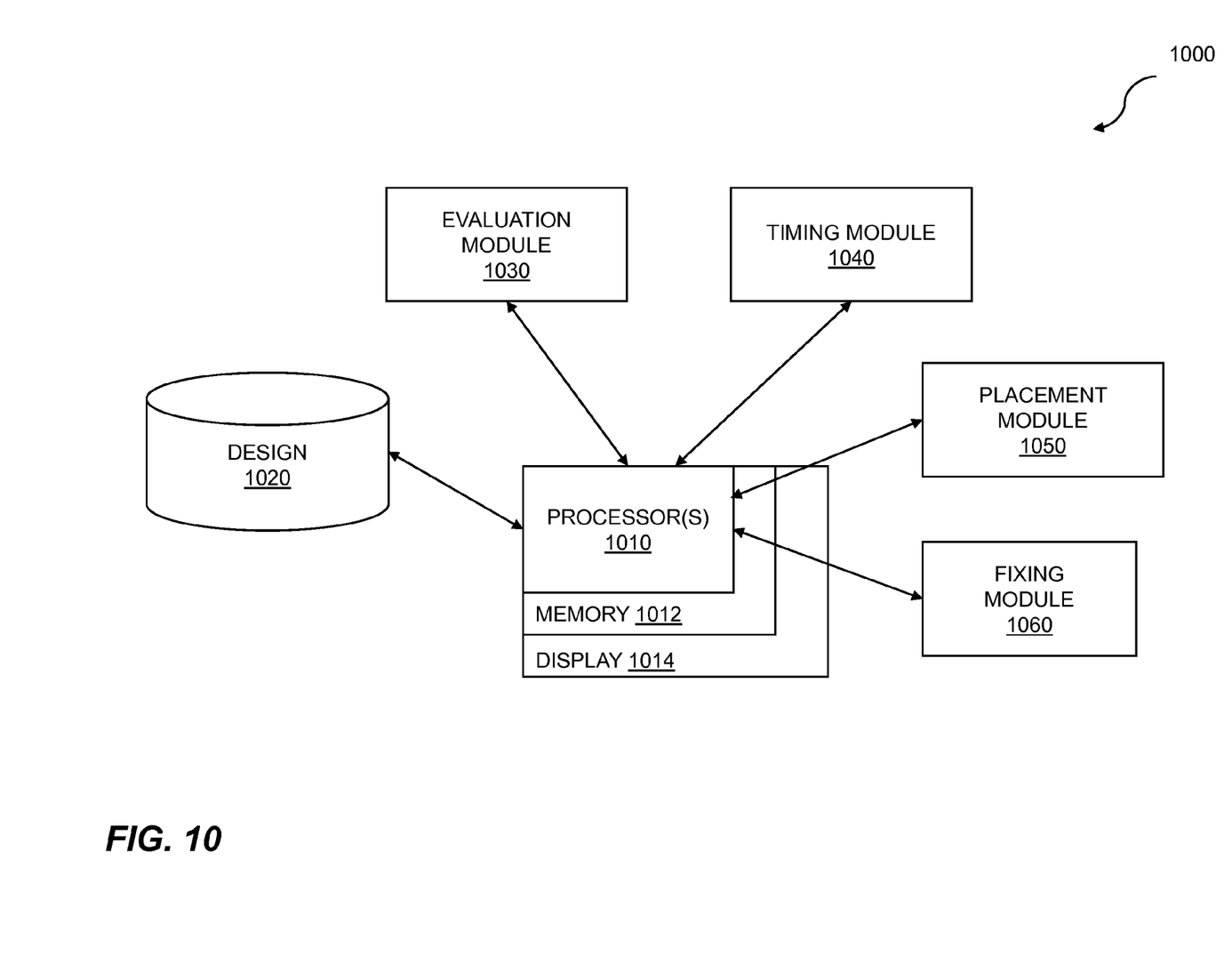
FIG. 10 is a system diagram for hold-time fixing.

FIG. 10 is a system diagram for hold-time fixing. A system 1000 for hold-time fixing comprises one or more processors 1010 coupled to a memory 1012 which stores instructions, and a display 1014. The display may be any electronic display, including but not limited to, a computer display, a laptop screen, a net-book screen, a tablet computer screen, a cell phone display, a mobile device display, a remote with a display, a television, a projector, or the like. The processors 1010 may obtain an overall design 1020, use an evaluation module 1030 to evaluate the design based on ideal clocks, use a timing module 1040 to estimate hold-time requirements for the design based on the ideal clocks, use a placement module 1050 to allocate placement regions for the design wherein the placement regions are to be used during hold-time fixing, and use a fixing module 1060 to perform hold-time fixing on the design. In at least one embodiment, the one or more processors 1010 accomplish the functions of the evaluation module 1030, the timing module 1040, the placement module 1050, and/or the fixing module 1060. The one or more processors access a design 1020 wherein the design comprises global cells, macrocells, regular logic, and the like. The evaluation module 1030 can evaluate a design based on ideal clocks. The ideal clocks may be used to source clock tree structures and to enable hold-fixing scenarios. The timing module 1040 may identify hold-time violations. The placement module 1050 may place global cells, macrocells, regular logic and the like. The placement module 1050 also identifies regions which are to be used for later hold-fixing purposes. The fixing module 1060 provides hold-fixing of a design by adding buffers, sizing buffers, removing buffers, prioritizing wiring of circuitry and the like. The system 1000 may include computer program product comprising: code for obtaining a design; code for evaluating the design based on ideal clocks; code for estimating hold-time requirements for the design based on the ideal clocks; code for allocating placement regions for the design wherein the placement regions are to be used during hold-time fixing; and code for performing hold-time fixing on the design.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for design analysis and modification comprising:
   evaluating a semiconductor design based on ideal clocks;
   estimating hold-time requirements for the design based on the ideal clocks;
   allocating, using one or more processors, placement regions for the design wherein the placement regions are to be used during hold-time fixing, wherein the allocating of placement regions to be used during hold-time fixing allows for access to pins on blocks within the design;
   wiring track routes for the design wherein the wiring of track routes for hold-time critical nets is performed later than wiring of nets without hold-time violations; and
   modifying the design by performing hold-time fixing on the design.

2. The method of claim 1 wherein clock constraints are used as part of the estimating of hold-time requirements.

3. The method of claim 1 further comprising performing placement.

4. The method of claim 3 wherein the placement includes incremental global placement.

5. The method of claim 3 wherein the placement is based on buffers that are inserted as part of the hold-time fixing.

6. The method of claim 1 further comprising estimating a number of buffers required.

7. The method of claim 6 further comprising reserving required routing resources for the number of buffers.

8. The method of claim 1 further comprising placing buffers as part of the hold-time fixing.

9. The method of claim 1 further comprising determining critical clock-gate enable paths.

10. The method of claim 9 wherein the determining of the critical clock-gate enable paths is used in the hold-time fixing.

11. The method of claim 1 further comprising re-evaluating hold times once the wiring of track routes is accomplished.

12. The method of claim 11 further comprising incrementally adjusting buffering to improve hold times.

13. The method of claim 1 further comprising detail routing wires for the design.

14. The method of claim 1 further comprising performing clock-tree synthesis for the design.

15. The method of claim 14 further comprising incrementally removing space remaining in the placement regions that were allocated.

16. A computer system for design analysis and modification comprising:
   a memory which stores instructions;
   one or more processors coupled to the memory wherein the one or more processors are configured to:
     evaluate a semiconductor design based on ideal clocks;
     estimate hold-time requirements for the design based on the ideal clocks;
     allocate placement regions for the design wherein the placement regions are to be used during hold-time fixing, wherein the allocating of placement regions to be used during hold-time fixing allows for access to pins on blocks within the design;
     wire track routes for the design wherein the wiring of track routes for hold-time critical nets is performed later than wiring of nets without hold-time violations; and modify the design by performing hold-time fixing on the design.

17. The system of claim 16 wherein the wherein the one or more processors are further configured to perform placement where the placement is based on buffers that are inserted as part of the hold-time fixing.

18. The system of claim 16 wherein the wherein the one or more processors are further configured to estimate a number of buffers required and reserve required routing resources for the number of buffers.

19. The system of claim 16 wherein the wherein the one or more processors are further configured to wire track routes for the design and re-evaluate hold times once wiring of track routes is accomplished.

20. A computer program product embodied in a non-transitory computer readable medium for design analysis and modification comprising:
    code for evaluating a semiconductor design based on ideal clocks;
    code for estimating hold-time requirements for the design based on the ideal clocks;
    code for allocating placement regions for the design wherein the placement regions are to be used during hold-time fixing, wherein the allocating of placement regions to be used during hold-time fixing allows for access to pins on blocks within the design;
    code for wiring track routes for the design wherein the wiring of track routes for hold-time critical nets is performed later than wiring of nets without hold-time violations; and
    code for modifying the design by performing hold-time fixing on the design.

21. The computer program product of claim 20 further comprising code for performing placement where the placement is based on buffers that are inserted as part of the hold-time fixing.

22. The computer program product of claim 20 further comprising code for estimating a number of buffers required and code for reserving required routing resources for the number of buffers.

23. The computer program product of claim 20 further comprising code for re-evaluating hold times once the wiring of track routes is accomplished.

24. The computer program product of claim 23 further comprising code for incrementally adjusting buffering to improve hold times.

25. The system of claim 19 wherein the wherein the one or more processors are further configured to incrementally adjust buffering to improve hold times.

26. The computer program product of claim 20 wherein the hold-time fixing on the design is based on a constant model for signals and clocks.

27. The computer program product of claim 20 wherein the hold-time fixing on the design uses hold-fixing scenarios which are determined and activated prior to placement.

28. The computer program product of claim 20 wherein the hold-time fixing on the design takes into account global models of clocks and signals.

* * * * *